US005828845A

United States Patent [19]
Jagadish et al.

[11] Patent Number: 5,828,845
[45] Date of Patent: Oct. 27, 1998

[54] INTERRUPT-BASED SYSTEM

[75] Inventors: Hosagrahar Visvesvaraya Jagadish; Inderpal Singh Mumick, both of Berkeley Heights; Abraham Silberschatz, Summit, all of N.J.

[73] Assignee: AT&T Corp, Middletown, N.J.

[21] Appl. No.: 525,931

[22] Filed: Sep. 8, 1995

[51] Int. Cl.$^6$ .............................. G06F 15/16; H04N 7/10
[52] U.S. Cl. .............................. 395/200.59; 395/200.55; 395/200.49; 707/10; 348/7
[58] Field of Search ..................... 395/200.01, 200.06, 395/200.12, 187.01, 188.01, 200.11, 2.82, 352, 353, 232, 610, 200.49, 200.55, 200.59, 200.54; 348/7; 455/4.2; 705/32; 704/273; 345/352, 353; 707/10

[56] References Cited

U.S. PATENT DOCUMENTS

| | | |
|---|---|---|
| 4,718,107 | 1/1988 | Hayes . |
| 4,852,154 | 7/1989 | Lewis et al. . |
| 4,878,245 | 10/1989 | Bradley et al. . |
| 4,939,352 | 7/1990 | Sunyich . |
| 5,168,372 | 12/1992 | Sweetser . |
| 5,191,410 | 3/1993 | McCalley et al. . |
| 5,206,722 | 4/1993 | Kwan . |
| 5,231,661 | 7/1993 | Harnum et al. . |
| 5,282,262 | 1/1994 | Kurashige . |
| 5,287,403 | 2/1994 | Atkins et al. . |
| 5,321,514 | 6/1994 | Martinez . |
| 5,361,100 | 11/1994 | Teece . |

OTHER PUBLICATIONS

Aggrawal, J.K. and Nandhakumar, N., *On the Computation of Motion from Sequences of Images—A Review*, Proceedings of the IEEE, vol. 76, No. 8. Aug. 1988, pp. 917–935.

Bove, V. Michael, Jr. et al., *Real–Time Decoding and Display of Structured Video*, Proc. IEEE ICMCS, May 1994, pp. 456–462.

Downton, A.C. and Drouet, H., *Model–Based Image Analysis for Unconstrained Human Upper–Body Motion*, IEE 4th International Conference on Image Processing and It's Applications, No. 354, pp. 274–277.

Kambhamettu, Chandra and Goldgof, Dimitry B., *Curvature–Based Approch to Point Correspondence Recovery in Conformal Nonrigid Motion*, CVGIP: Image Understanding, vol. 60, No. 1, Jul. 1994, pp. 26–43.

Liedtke, C.–E, et al., *Automatic Modelling of 3D Moving Objects from a TV Image Sequence*, SPIE, vol. 1260, Feb. 1990.

Morikawa, H. and Harashima, H., *3D Structure Extraction Coding of Image Sequences*, Journal of Visual Communication and Image Representation, vol. 2, No. 4, Dec. 1991, pp. 332–344.

Poli, Riccardo et al. *Recovery of 3D Closed Surfaces from Sparse Data*, CVGIP: Image Understanding, vol. 60, No. 1,. Jul. 1994, pp. 1–25.

Weng, Juyang et al., *Motion and Structure from two Perspective Views: Algorithms, Error Analysis, and Error Estimation*, IEEE Transactionas on Pattern Analysis and Machine Intelligence, vol. II, No. 5, May 1989, pp. 451–460.

*Primary Examiner*—Mark H. Rinehart

[57] ABSTRACT

An apparatus and method provide an interrupt-based add-on service for use in a service subscription system having a central service provider and at least one subscriber unit. The interrupt-based system includes a database for storing subscriber information specific to at least one subscriber, where the subscriber information includes at least one subscriber selectable condition. The system further includes a computer for interrupting a service request when the service request satisfies at least one subscriber selectable condition and for making a service connection when the service request does not match the subscriber selectable condition.

22 Claims, 5 Drawing Sheets

FIG. 5a

| SUBSCRIBER UNIT IDENTIFICATION | HOURS VIEWED | ACTION CODE |
|---|---|---|
| 123-456-7890 | 0 - 5 | PERMIT |
| 123-456-7890 | 5 - 10 | OPERATOR |
| 123-456-7890 | 10 - MORE | REJECT |

FIG. 5b

| SUBSCRIBER UNIT IDENTIFICATION | MOVIE RATING | ACTION CODE |
|---|---|---|
| 123-456-7890 | PG-13 | PERMIT |
| 123-456-7890 | R | OPERATOR |
| 123-456-7890 | X | PASSWORD=123 |
| 123-456-7890 | XXX | REJECT |

INTERRUPT-BASED SYSTEM

TECHNICAL FIELD

This invention relates to a class of add-on services that is applicable to communication, banking and entertainment services. More particularly, the invention relates to an interrupt-based service where a subscriber service request is interrupted whenever the request satisfies a certain condition that was pre-specified by the subscriber.

BACKGROUND OF THE INVENTION

Generally, wireless mobile telephone systems, credit card systems or interactive television systems comprise a central or distributed service provider connected to a plurality of subscribers for providing services such as telephone connecting services or pay-per-view. The service provider includes equipment for performing various tasks that include subscriber data collection, data processing, customer service, billing and accounting. For example, the interactive television systems include a communication network to carry signals from the cable headend to distribution hubs, from which the signals are sent through trunks, feeder and drop cables to subscribers. The interactive television systems also include processors for billing and accounting at the headend. Similar system arrangement exists in the credit card systems where telephone transmission lines are used to communicate with point-of-sale terminals located at the subscriber's premises and a host computer verifies proper authorization and process billing information. In a wireless mobile telephone system, a call originated from a cellular phone is picked up by receiving circuitry in a cell cite in the vicinity of the cellular phone and routed via a land-line trunk to a mobile communication switching system, and eventually sent to a telephone network. The accounting and billing information for subscribers are usually stored and processed in the switching system.

For limiting unauthorized or fraudulent uses, some service providers of wireless mobile telephone system or credit card systems have implemented programs in which abnormal activities in the accounts are monitored. For example, some wireless mobile telephone providers offer secret personal identification numbers that must be entered to activate a cellular phone. Only the subscriber and the wireless mobile telephone provider have the number. Other cellular service providers monitor subscriber cellular phones for abnormal patterns based on the records of recent phone calls. The cellular service provider then may choose to close the account with abnormal activities. Similarly, credit card service providers monitor subscriber usage for a sudden increase of purchases with follow up calls to the credit card owner by a representative of the service provider. However, there seems to be a limit as to how much the checking programs accomplish, because the artificial threshold usage amount set by the credit card company does not reflect the diverse traits or changing patterns of credit card usage by individual users. In other words, it may be too late to prevent fraudulent uses by the time the warning is given. Moreover, this program is not a preventive scheme because such calls by the representative are made hours or days after the actual purchase.

For interactive television, preventive schemes that reflect individual usage traits have been attempted to prevent unauthorized viewing. For example, U.S. Pat. No. 5,168,372 to Sweetser proposes a control system disposed at the viewer's premise that disables viewing of a television program when a viewer has watched the television beyond a preset amount of time. The allowable viewing time can be set on a daily or weekly basis to prevent excessive or unauthorized viewing of the television. U.S. Pat. No. 5,231,661 to Harnum et al. and U.S. Pat. No. 4,718,107 to Hayes also propose similar devices located at the viewer's premise for controlling television usage. However, these proposed systems require separate control equipment disposed at the subscribers's premises to keep track of usage and to disable viewing of the television.

SUMMARY OF THE INVENTION

The interrupt-based system of the present invention is operated by a central service provider and interrupts a service request when a subscriber selectable condition is met. For example, when the subscriber selectable condition is satisfied, a telephone call is redirected to a telephone operator or an authentication system to verify proper authority. The subscriber selectable condition can be specified in advance by the subscriber or the service provider based upon calling patterns or subscriber usage data. The telephone calls, made by the subscriber, including 900 calls and long distance calls, can then be checked based on the subscriber selectable condition. The interrupt-based communication system is applicable to other subscribed service systems such as pay-per-view movies, interactive televisions, calling cards or credit cards.

In an exemplary embodiment directed to pay-per-view service, the interrupt-based communication system comprises a database for storing subscriber information specific to at least one subscriber. The subscriber information includes at least one subscriber selectable condition for triggering an interruption of a service request when satisfied. The system further comprises a host computer. The host computer is configured for detecting at least one request signal from a subscriber unit, identifying the requesting subscriber unit, extracting at least one service request from the detected request signal, accessing from the subscriber database at least one subscriber selectable condition specific to the identified requesting subscriber unit, comparing the extracted service request and the subscriber selectable condition, interrupting the service request when the service request satisfies the subscriber selectable condition, and making a service connection when the service request is not interrupted. The information in a database is preferably updated in real time after each service connection is made. A subscriber of pay-per-view service specifies in advance at least one condition interacting with this real time database so that a service request can be interrupted if such request matches the subscriber selectable condition. For example, a monthly budget for a certain pay-per-view account can be set so that any additional order exceeding the budget can be interrupted. When the condition is not met, the order would be processed in a regular manner. When the condition is met and the monthly budget is finally exhausted, the order will be directed to an operator. The operator has access to the subscriber information database so that, if the subscriber wants to resume the service request, the operator can verify a valid authority.

BRIEF DESCRIPTION OF THE DRAWINGS

FIGS. 5a and 5b are tables of exemplary conditions selectable by an interactive TV user.

DETAILED DESCRIPTION OF THE PREFERRED EMBODIMENTS

Figure 1:
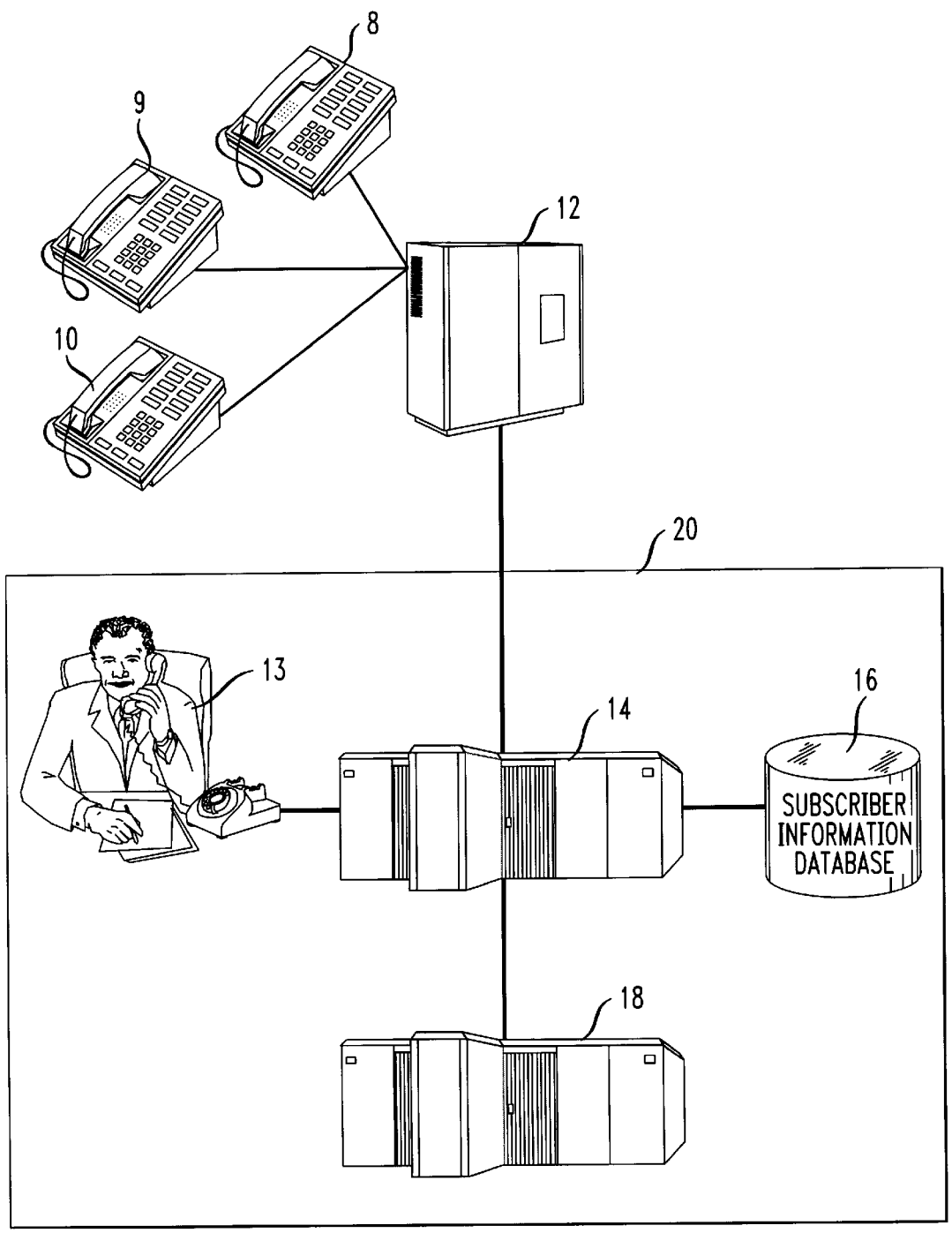
FIG. 1 is a block diagram illustrating a pay-per-view network including an illustrative interrupt-based communication system of the present invention.

According to a preferred embodiment of the present invention, FIG. 1 illustrates a cable television pay-per-view network that includes an interrupt-based communication system. As used in this application, "subscriber" refers to the entity for which service is provided, and "service provider" refers to the entity which normally provides subscribed services to a plurality of subscribers and includes means for implementing the interrupt-based communication system. The interrupt-based communication system involves a plurality of telephones 8, 9, 10, a switch 12, an operator 13, a host computer 14, a subscriber information database 16 and a cable television system 18. The service provider includes some of the components described above such as the operator 13, the host computer 14, the subscriber information database 16 and the cable television system 18.

The plurality of telephones 8, 9, 10 are the subscriber units located at the subscribers's premises for placing pay-per-view orders. Each of the telephones 8, 9, 10 is connected to the switch 12 in a public telephone network. The routing of calls between the telephones 8, 9, 10 and the switch 12 is well-known in the art. Alternatively, a plurality of set-top boxes (not shown) disposed on cable televisions at the subscribers's premises can be the subscriber units for placing pay-per-view orders. The set-top boxes may be connected to the service provider 20 via a cable television network in a manner well-known in the art. In another example, a plurality of personal computers connected via modem to the service provider can be the subscriber units for placing orders.

The switch 12 performs call processing functions for the telephones 8, 9, 10. For example, the switch 12 handles dialed numbers and connects the calls to the host computer 14 when the dialed numbers are for the pay-per-view service provider 20. The switch 12 may be located in a network provided by a local exchange carrier (LEC) such as the Regional Bell Operating Companies or a long distance carrier such as AT&T. The host computer 14 is coupled to the subscriber information database 16 and serves to process, store and update the necessary data. The subscriber information database 16 maintains, among other data, subscriber unit identification, usage information specific to each subscriber unit and subscriber selectable conditions for interruptions for each subscriber unit. The usage information includes data such as the total number of accumulated pay-per-view orders since the last billing period for the respective subscriber unit. The subscriber information database 16 may be kept in the main memory so that information stored therein can be accessible in real time. Alternatively, the usage information may be maintained in a high-performance transaction database with fast querying and updating ability so as to enable prompt responses to subscribers during pay-per-view ordering process. Such configuration allows many usage patterns to be evaluated in virtually real time so that the condition prompting an interruption can be set up in terms of the usage pattern. A subscriber can restrict a total charge per time unit, a total number of programs per time unit or a total amount of viewing time per time unit. For example, the subscriber can specify that if the number of ordered interactive TV programs exceeds ten within one day, the service request should be interrupted. The cable television system 18 is controlled by the host computer 14 for providing pay-per-view service. The control of the cable television system 18 in connection with the pay-per-view network may be implemented in a manner generally known in the art.

Figure 2:
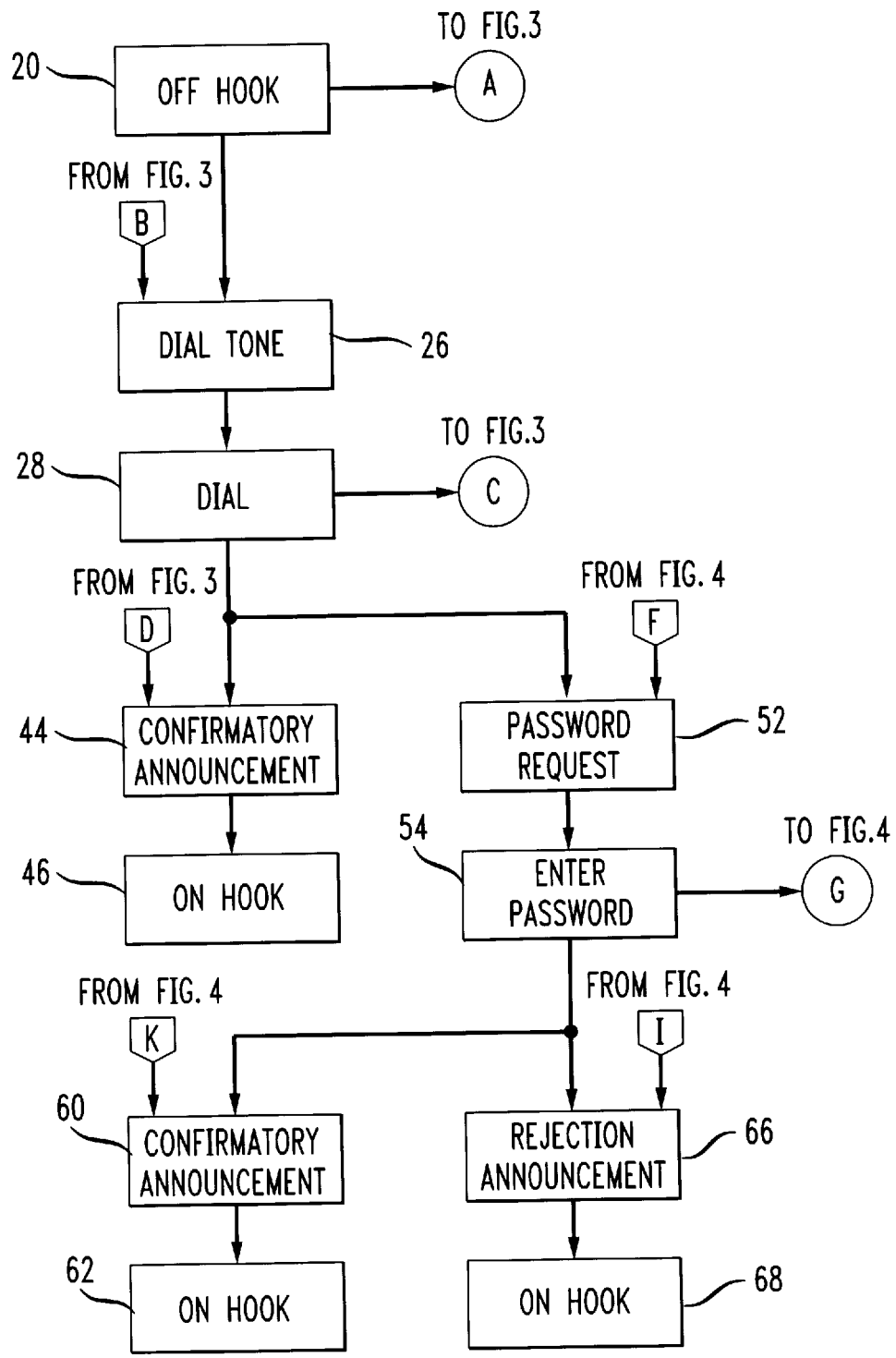
FIG. 2 shows a flow chart illustrating an exemplary operation of a telephone in connection with the interrupt-based communication system.
Figure 3:
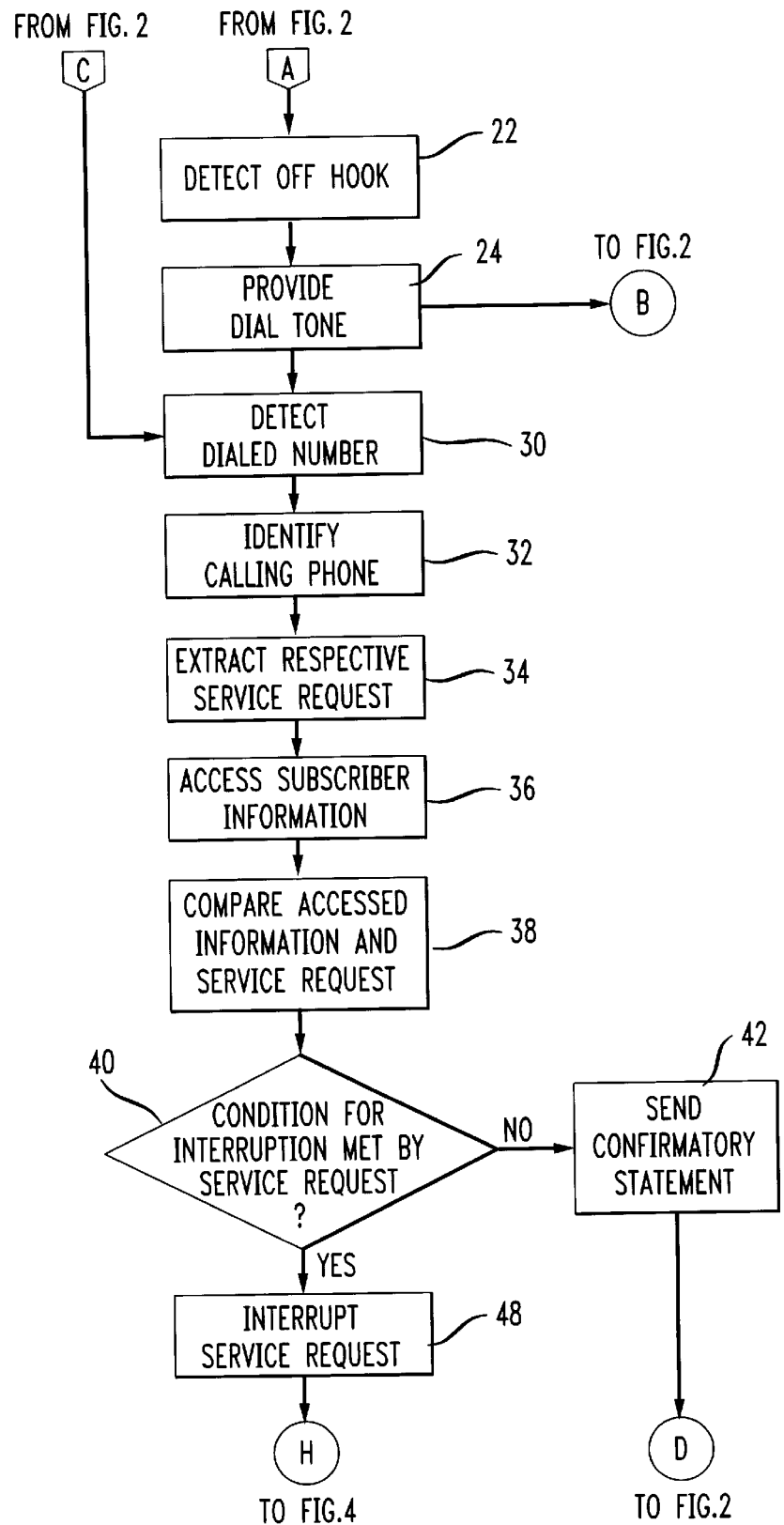
FIGS. 3 and 4 show flow charts illustrating the operation of an illustrative interrupt-based communication system in connection with the operation of the phone as shown in FIG. 2.
Figure 4:
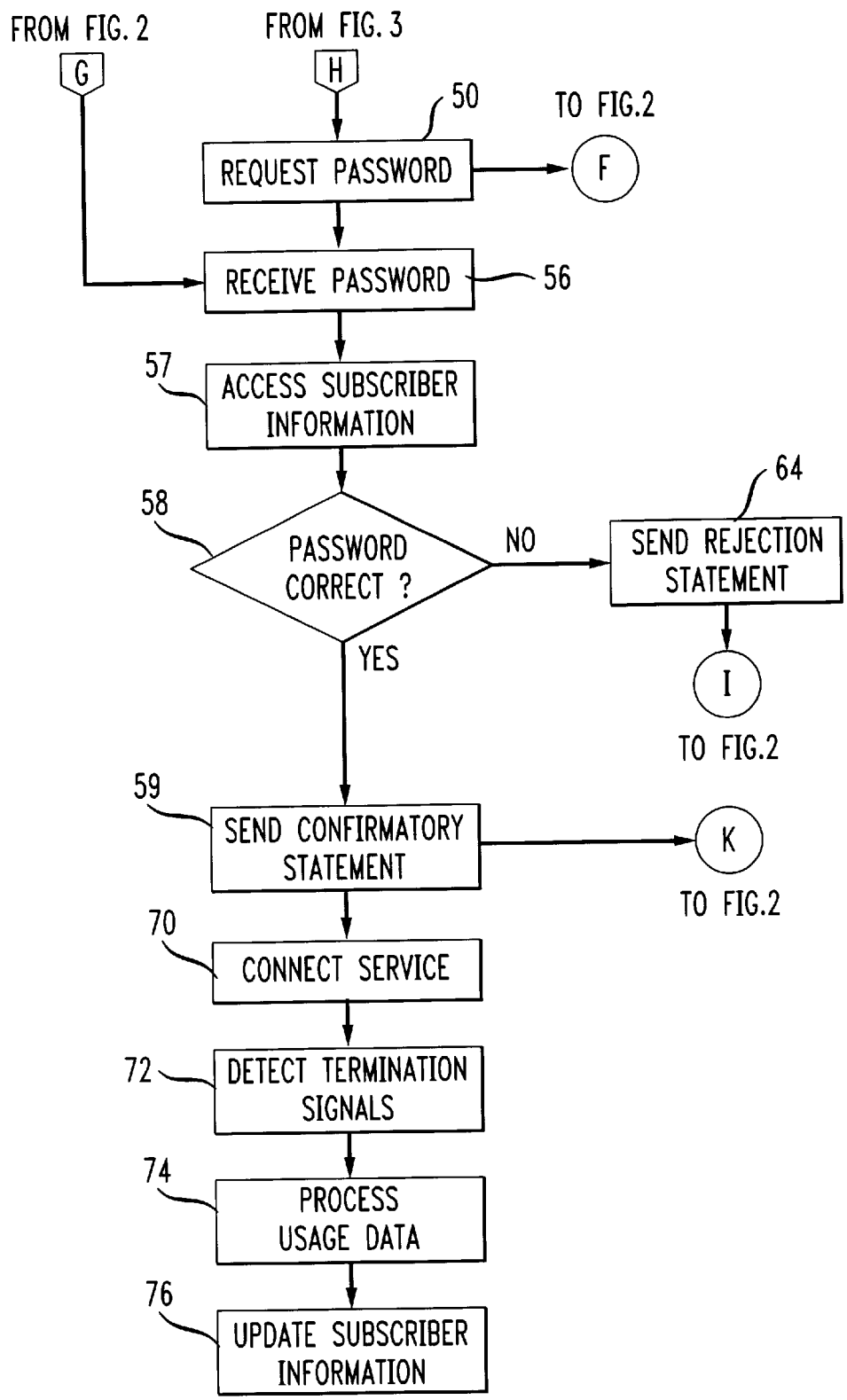

FIGS. 2, 3 and 4 are flow charts of an illustrative operation of the passive information access system in connection with a telephone 10. More specifically, FIG. 2 illustrates the operation steps processed in the telephone 10 while FIGS. 3 and 4 illustrate the operation steps processed in the service provider 20 and the switch 12.

The switch 12 handles the call handling process in the present invention that includes call origination, dialed directory number collection, calling number identification, trunk search, trunk seizure, and call termination as any conventional call traffic in a regular telephone network. The switch 12 detects when one of the telephones goes off-hook (step 20) by sensing a DC current (step 22). The switch 12 then generally provides a dial tone (step 24) which is relayed back to the telephone 10 (step 26). The subscriber then may request service by dialing a number that is assigned to a pay-per-view event (step 28). The switch 12 detects the request signals (step 30) and executes the connection to the host computer 14 of the pay-per-view service provider as the destination of the call. At the same time, a conventional automatic number identification process takes place in the switch 12 (step 32) and the originating telephone 10 is identified. The host computer 14 extracts a service request, for example, the corresponding pay-per-view event from the detected request signals (step 34). The host computer 14 also accesses its subscriber information database 16 and retrieves subscriber information specific to the identified requesting telephone 10 (step 36). Among the retrieved subscriber information, there is at least one subscriber selectable condition specific to the telephone 10. The subscriber selectable condition is set up in advance by the subscribers of pay-per-view service, for example, at the time of the cable TV subscription sign-up. At such time, the subscriber specifies certain conditions such as accumulated charge limits during a billing period or permissible movie ratings so that, when such conditions are satisfied, the service requests are interrupted. The subscriber can also set up the conditions so that the subscriber selectable conditions prompting interruptions are effective only during certain hours. On the other hand, the subscriber can specify no condition at all so that his service request would never be interrupted. Based on the retrieved subscriber selectable conditions, the host computer 14 compares whether the service request meets any of the subscriber selectable conditions (step 38). If the conditions are not met, then a confirmatory statement is provided (step 42) and relayed back to the telephone 10 for an announcement (step 44) followed by service connections. The subscriber may then hang up the telephone 10 (step 46).

If the service request meets any of the subscriber selectable conditions, the host computer 14 interrupts service requests (step 48). The interruption is followed by a password request (step 50) which is presented to the subscriber (step 52). The interrupted service request can be handled in various ways. For example, the subscriber may be switched to a speech recognition system in which a request for a password is announced to the subscriber and subscriber's password response in voice is evaluated for verification. In another example, the subscriber may be switched to a menu system in which various options are offered either in display or announcement and a subscriber can respond by either using key boards or touch-tone phones to select one of the options. The subscriber may respond to the message by entering a password (step 54). The host computer 14 receives this password (step 56), accesses a pre-determined password specific to the telephone 10 from the subscriber information database 16 (step 57) and compares the received password with the accessed password (step 58). If the password is incorrect, then a rejection statement is presented (step 64) and announced (step 66). The subscriber may then hang up the telephone 10 (step 68). The rejection statement can be followed by a service from an operator who can authorize the service connections. If the password is correct, then the confirmatory statement is sent (step 59) and the announcement is made at the telephone 10 that the service connection would be established (step 60). The subscriber may then hang up the telephone 10 (step 62).

Alternatively, when the service is interrupted (step 48), the host computer 14 connects the telephone 10 to an operator 13 who may request a password (step 50). When a subscriber at the telephone 10 enters his password, the operator 13 receives the password (step 56) entered by the subscriber (step 54), accesses a pre-determined password from the subscriber information database 16 (step 57), and compares the received password with the accessed password to determine whether to make service connections (step 58). The operator 13 may further interact with the subscriber in ways other than receiving the password to determine whether to make service connections. For example, the operator 13 may request the subscriber to provide his social security number or mother's maiden name to establish valid authority to make service connections.

The host computer 14 makes service connections whenever the confirmatory message is sent back to the telephone 10 (steps 44, 70) as generally known in the art. For example, the host computer 14 establishes the service connections for pay-per-view events between cable television system 18 and the subscriber by sending an order to the cable television system 18. The host computer 14 also detects termination of the service connections (step 72) and processes usage data of the service connections for each respective subscriber unit (step 74). Subsequently, the host computer 14 updates the subscriber information database 16 based on the processed usage data (step 76).

Figs. 5a and 5b illustrate examples of data stored in the subscriber information database 16, which may be in a table format having columns and rows. The table in FIG. 5a includes subscriber unit identifications, total number of hours that pay-per-view services have been ordered, and the action codes for the consequences for when the subscriber selectable condition is met. For example, when the number of hours viewed is under five, then the pay-per-view request is allowed. If the number of hours falls between 5–10 hours, then the host computer 14 connects the call to an operator 15 who is provided with the relevant information about the account of a subscriber at the telephone 10. The operator may ask for a password to determine whether to resume service. The operator 15 may reject the service request if the proper password is not provided by the subscriber. If the number of hours has accumulated above 10 hours, the service request may be automatically rejected. The table in FIG. 5b includes subscriber unit identifications, movie ratings, and action codes. For example, if the movie rating is PG 13, then the movie request is automatically granted. If the movie rating is R then the host computer 14 connects the call to an operator 15. Again the password scheme is used to determine whether to resume service. If the movie rating is X, then the automatic password operation requires a password when the host computer compares the password without use of a human operator. The subscriber may enter the password to resume service. If the movie rating is XXX, the request may be automatically rejected. The table may, alternatively, include the maximum number of pay-per-view television programs that can be ordered, the maximum accumulated charge or the maximum time permitted during a time unit. Additionally, the subscriber can set these conditions so that the interruptions are effective only during certain hours.

In another embodiment, the interrupt-based communication system can be applied to calling or credit card services where a subscriber can specify a condition prompting an interruption of a transaction based on a usage limit such as a maximum accumulated charge. Further, the subscriber can specify a maximum number of concurrent calls permitted from a single calling card number. This number is usually set by the number of family members sharing the same calling card number. When the number of concurrent calls exceeds the specified maximum number, this is usually an indication of fraudulent use. The subscriber can either specify that the calls exceeding the maximum number be terminated or redirected to an operator.

In another embodiment, the interrupt-based communication system can be applied to telephone services where a condition to interrupt a call is based on a usage limit such as a maximum accumulated charge for long distance calls. In such a telephone communication system, a host computer connected to a switching system accesses a database that maintains relevant information about each of the subscribers during the call set-up time. The information includes various usage data such as type of phone calls, time of the day when the calls are made and duration of calls. Such information is kept in main memory so that calling information can be evaluated in real time as the calls are being processed. A subscriber, for example, can limit the number of long-distance calls, international calls or 900 calls to be less than five in each day. The subscriber can also specify that any calls exceeding the set amount be redirected to an operator so that the subscriber can decide whether to increase the amount or terminate the call. For example, when a monthly budget is exhausted, the subscriber may have options between increasing the monthly budget or terminating the call.

While the invention has been described particularly in reference to a pay-per-view system, credit or calling card system and telephone system, the interrupt-based communication system of the present invention is not limited to these systems and can be applied to other communication services such as an interactive television system. Accordingly, it is intended by the appended claims to cover all modifications of the invention which fall within the spirit and scope of the invention.

We claim:

1. An interrupt-based system for use in a service subscription system having a central service provider and at least one subscriber unit, said interrupt-based system comprising:

a database for storing subscriber information specific to said at least one subscriber unit, said subscriber information including at least one subscriber selectable condition;

detecting means for detecting at least one request signal from said at least one subscriber unit;

identifying means for identifying said at least one requesting subscriber unit;

extracting means for extracting at least one service request from said at least one detected request signal;

accessing means for accessing from said database subscriber information specific to said at least one identified requesting subscriber unit;

comparing means for comparing said at least one extracted service request and said at least one subscriber selectable condition;

connecting means for making service connections when said at least one extracted service request does not meet said at least one subscriber selectable condition; and interrupting means for interrupting said at least one service request when said at least one extracted service request meets said at least one subscriber selectable condition.

2. The system as defined in claim 1, further comprising resuming means for resuming said at least one service request after an interruption of said at least one service request, said resuming means comprising:

said database for further storing at least one pre-determined password specific to said at least one subscriber unit;

requesting means for requesting at least one password from said at least one interrupted subscriber unit when said at least one service request is interrupted;

said detecting means for further detecting at least one password signal from said at least one interrupted subscriber unit;

said extracting means for further extracting said at least one password from said at least one detected password signal;

said accessing means for further accessing from said database said at least one pre-determined password specific to said at least one interrupted subscriber unit;

said comparing means for further comparing said at least one extracted password and said at least one pre-determined password; and said connecting means for further making said service connection when said at least one extracted password matches said at least one predetermined password.

3. The system as defined in claim 2, wherein said resuming means includes a speech recognition system.

4. The system as defined in claim 2, wherein said resuming means includes a menu-based system.

5. The system as defined in claim 2, wherein said resuming means includes an operator.

6. The system as defined in claim 1, further comprising a modifying means for modifying said at least one subscriber selectable condition upon an interruption of said at least one service request.

7. The system in claim 1, further comprising:

said detecting means for further detecting termination of said service connection; and processing means for processing usage data related to said service connection for said at least one subscriber unit upon said detection of said termination and for updating said accessed subscriber information based on said processed usage data related to said service connection.

8. The system as defined in claim 1, wherein said at least one subscriber selectable condition includes a usage limit in terms of maximum dollar amount for accumulated service charges.

9. The system as defined in claim 1, wherein said at least one subscriber selectable condition includes a usage limit in terms of maximum accumulated time of service connections.

10. The system as defined in claim 1, wherein said at least one subscriber selectable condition is effective only during a certain time period.

11. The system as defined in claim 1, wherein said service provider provides pay-per-view television services and said at least one subscriber selectable condition includes a movie rating.

12. The system as defined in claim 1, wherein said service provider provides interactive television services and said at least one subscriber selectable condition includes an interruptible pattern in terms of a maximum number of ordered programs per time unit.

13. The system as defined in claim 1, wherein said service provider provides credit card services and said at least one subscriber selectable condition includes an interruptible pattern in terms of a maximum number of credit card charges per time unit.

14. The system as defined in claim 1, wherein said service provider provides calling card services and said at least one subscriber selectable condition includes a calling pattern in terms of a number of concurrent calls permitted from a single calling card number.

15. The system as defined in claim 1, wherein said service provider provides telephone services and said at least one subscriber selectable condition includes an interruptible pattern in terms of a maximum number of non-local calls per time unit.

16. An interrupt-based system for use in a service subscription system having a central service provider and at least one subscriber unit, said interrupt-based system comprising:

a database for storing subscriber information specific to said at least one subscriber unit, said subscriber information including at least one subscriber selectable condition for said at least one subscriber unit;

a receiver for receiving at least one request signal from said at least one subscriber unit and for identifying said at least one requesting subscriber unit;

a host computer for extracting at least one service request from said at least one received request signal, for accessing from said database subscriber information specific to said at least one identified requesting subscriber unit, for comparing said at least one extracted service request and said at least one subscriber selectable condition, for making a service connection when said at least one extracted service request does not meet said at least one subscriber selectable condition and for interrupting said at least one service request when said at least one extracted service request meets said at least one subscriber selectable condition.

17. The system in claim 16, further comprising resuming means for resuming said at least one service request after an interruption of said at least one service request, said resuming means comprising:

said database for further storing at least one pre-determined password specific to said at least one subscriber unit;

said host computer for further requesting at least one password from said at least one subscriber unit when said at least one service request is interrupted;

said receiver for further receiving at least one password signal from said at least one interrupted subscriber unit; and said host computer for further extracting said at least one password from said at least one received password signal, for accessing from said database said at least one pre-determined password specific to said at least one interrupted subscriber unit, for comparing said at least one extracted password and said at least one pre-determined password, and for making said service connection when said at least one extracted password matches said at least one pre-determined password.

18. The system in claim 16, further comprising:

said host computer for further detecting termination of said service connection, for processing usage data related to said service connection for said at least one subscriber unit upon said detection of said termination and for updating said accessed subscriber information based on said processed usage data related to said service connection.

19. A method for providing interrupt-based service for use in a service subscription system having a central service provider and at least one subscriber unit, wherein subscriber information specific to said at least one subscriber unit is stored in said service subscription system and said subscriber information includes at least one subscriber selectable condition for said at least one subscriber unit, comprising the steps of:

detecting at least one request signal from said at least one subscriber unit;

identifying said at least one requesting subscriber unit;

extracting at least one service request from said at least one detected request signal;

accessing from database subscriber information specific to said at least one identified requesting subscriber unit;

comparing said at least one extracted service request and said at least one subscriber selectable condition;

making a service connection when said at least one extracted service request does not meet said at least one subscriber selectable condition; and interrupting said at least one service request when said at least one extracted service request meets said at least one subscriber selectable condition.

20. The method in claim 19, further comprising the steps of:

storing at least one pre-determined password specific to said at least one subscriber unit;

requesting at least one password from said at least one subscriber unit when said at least one service request is interrupted;

detecting at least one password signal from said at least one subscriber unit;

extracting said at least one password from said at least one detected password signal;

accessing from said database said at least one pre-determined password specific to said at least one identified requesting subscriber unit;

comparing said at least one extracted password and said at least one pre-determined password; and making said service connection when said at least one extracted password matches said at least one pre-determined password.

21. The method in claim 19, further comprising the step of modifying said at least one subscriber selectable condition when said at least one service request is interrupted.

22. The method in claim 19, further comprising the steps of:

detecting termination of said service connection;

processing usage data related to said service connection for said at least one subscriber unit upon said detection of said termination; and updating said accessed subscriber information based on said processed usage data related to said service connection.

* * * * *